United States Patent [19]

Nagoshi

[11] 4,063,066

[45] Dec. 13, 1977

[54] FIXING APPARATUS FOR A COPYING MACHINE

[75] Inventor: Mitsuru Nagoshi, Hachioji, Japan

[73] Assignee: Konishiroku Photo Industry Co., Ltd., Tokyo, Japan

[21] Appl. No.: 746,090

[22] Filed: Nov. 30, 1976

[30] Foreign Application Priority Data

Dec. 4, 1975 Japan .................................. 50-164726

[51] Int. Cl.$^2$ .............................................. H05B 1/00
[52] U.S. Cl. ................................... 219/216; 219/469; 308/26; 308/184 R; 432/60
[58] Field of Search ................ 219/216, 388, 469–471; 432/59–60, 227–228; 100/93 RP; 308/20, 26, 184

[56] References Cited

U.S. PATENT DOCUMENTS

| 1,152,680 | 9/1915 | Wieselgreen | 308/184 R |
| 2,837,202 | 6/1958 | Baechli | 308/184 R X |
| 3,306,680 | 2/1967 | Bruyere | 308/184 R X |
| 3,423,573 | 1/1969 | Richards et al. | 219/470 X |
| 3,437,032 | 4/1969 | Manghirmalani et al. | 432/228 X |

FOREIGN PATENT DOCUMENTS 525,432   8/1940   United Kingdom ............ 308/184 R Primary Examiner—C. L. Albritton
Attorney, Agent, or Firm—Lane, Aitken, Dunner & Ziems

[57] ABSTRACT

A hollow fixing roll supported by bearing means, including a heater therewithin, an annular resin adiabatic member in the born part of the fixing roll and an annular rigid metal member disposed between the bearing means and the adiabatic member so as to cover the adiabatic member.

2 Claims, 3 Drawing Figures

FIXING APPARATUS FOR A COPYING MACHINE

BACKGROUND OF THE INVENTION

1. Field of the Invention

This invention relates to an improvement of fixing apparatus for a copying machine and, more particularly, to an improvement of a bearing device of a fixing roll or a heated roll including a heater therewithin.

2. Description of Prior Art

A fixing apparatus having a rotatable hollow fixing roll including therewithin a heating means having such a heating source as an infrared generating device, nickel-chromium heating wire, or a halogen lamp for heating the surface of the fixing roll from the inside is well known in the art of fixing powder images carried on a copying paper. Fixing is effected by driving the fixing roll and an associated back-up roll in pressure contact with the fixing roll with a copying sheet fed therebetween. Since the heat conduction to the bearing directly through the fixing roll causes the grease contained as lubricant in the bearing to be deteriorated, resulting in the damage of the bearing, an adiabatic resin member is also provided in the born part of the fixing roll for preventing the heat retained in the fixing roll from conducting to the bearing or other mechanical members through the bearing. But, in such device it has been found that the life of the adiabatic member is relatively limited. In electrophotographic copying machines which is able to reproduce a number of copies sequentially, the surface temperature of the fixing roll, generally, rises to 150° C to 200° C and as the result the adiabatic resin member is heated directly through the born part of the fixing roll heated by the heating means, causing the adiabatic member to expand not only in the radial direction but in the axial direction. Also, the fixing roll itself expands due to the heat so as to apply compression forces to the adiabatic member. Furthermore, the adiabatic member is subject to compression forces resulting from the fixing roll pressing the copying sheet against each other during the fixing process. The combination of these forces produces a great magnitude of compression force having a tendency to deform the adiabatic member within a relatively short period, causing the bearing part to loose and render its usage impossible and to apply a great magnitude of stress concentratedly to the portions of the adiabatic member at which the adiabatic member is in contact with the edges of the inner ring, causing the adiabatic member to be torn off or destroyed. Moreover, the inner ring of the bearing provided as a rotary bearing is disposed in pressure contact with the adiabatic member. This also increases the deformation of the adiabatic member.

SUMMARY OF THE INVENTION

In accordance with the present invention, there is provided an improved bearing device for supporting a fixing roll or a heated fuser roll of a copying machine, which includes a bearing, an annular adiabatic resin member disposed in the born part of the fixing roll containing a heating means therewithin, and an annular rigid metal member disposed between the inner member of the bearing and the adiabatic resin member to prevent generated heat from conducting to the bearing or other mechanical members.

In the bearing device as arranged above in accordance with the present invention the rigid member of metal is subject over its whole surface area to compression forces due to thermal expansion and the pressure of the fixing rolls against the copying sheet passing therebetween and is effective to prevent the deformation of the adiabatic member.

It is, accordingly, an object of the present invention to provide a bearing device in which a rigid metal member is provided so as to cover the resin adiabatic member in the born part of the fixing roll and to directly contact with the inner ring of the bearing, thereby preventing the deformation or damage of the resin adiabatic member.

It is another object of the present invention to provide an improved bearing device of a fixing roll for a copying machine, especially for a copying machine producing a number of copies in sequence, which can be used for a long period of time.

It is further object of the present invention to provide an improved fixing apparatus which can produce homogeneous fixing images onto a copying paper.

Further objects, features and advantages of the invention will become apparent as the invention is described more particularly hereinafter in connection with a preferred embodiment of the invention which is employed by way of example as a fixing device used in a fixing system for fusing toner images in copying process, reference being had to the accompanying drawings.

DESCRIPTION OF PREFERRED EMBODIMENT

Figure 1:
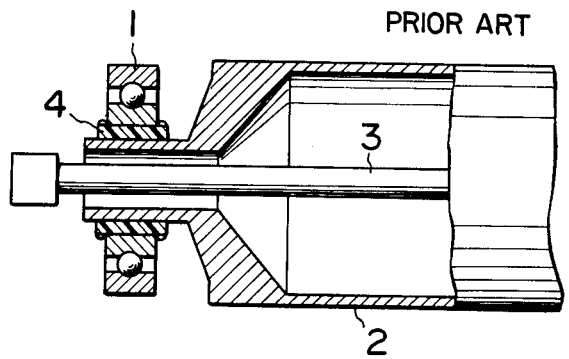
FIG. 1 is a partially sectional view of a conventional fixing apparatus comprising a fixing roll containing a rod heater therewithin, a bearing and a resin adiabatic member.

In a conventional fixing apparatus, generally as shown in FIG. 1, a bearing device such as a bearing 1 is provided for supporting a hollow fixing roll 2 which contains a rod heater 3 for heating the fixing roll 2 from the inside. Fixing is effected by driving a pair of a heated fixing roll 2 and a back-up roll (not shown) with a copying sheet fed therebetween. Also, an adiabatic resin member 4 is provided in the born portion of the fixing roll 2 for preventing conduction of heat retained in the fixing roll 2.

Figure 2:
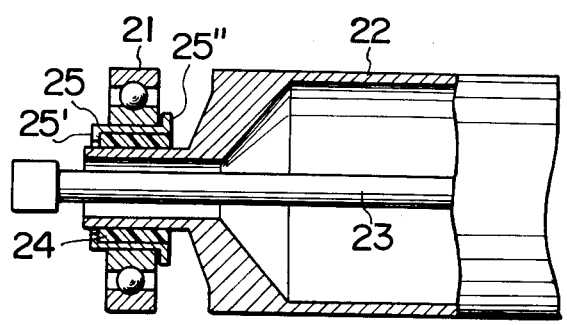
FIG. 2 is a partially sectional view showing an embodiment of the present invention provided with an annular rigid metal member having a fringe extending inwardly at an end portion thereof.
Figure 3:
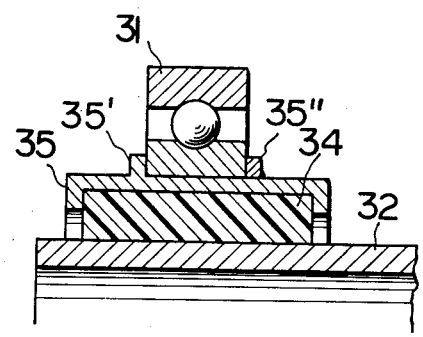
FIG. 3 is a sectional view showing another embodiment of the present invention provided with an annular rigid metal member having two fringes extending inwardly at the opposite ends thereof.

Referring now to FIG. 2 there is illustrated an embodiment of fixing device in which a bearing device in accordance with the present invention is applied. The fixing system includes a rotatable cylindrical fixing roll 22 supported by a bearing 21 and rotated by a suitable driving source in association with a back-up roll (not shown) disposed in pressure contact with the fixing roll 22 to form a nip through which a copying paper carrying toner images is moved to fuse and fix. The fixing roll 22 includes a rod heater in its hollow portion and is supported by a bearing device comprised of a bearing 21, an annular adiabatic resin member 24 in the form of a ring having, preferably, the thickness of 1 to 3 mm disposed in contact with the born surface of the fixing roll 22, and an annular rigid metal member 25 disposed between the inner member of the bearing 21 and the adiabatic resin member 24 without play. The rigid metal member 25 has, as shown in the figure, a fringe 25' extending inwardly which is effective to prevent the adiabatic resin member from disengaging with the bearing 21 and the fixing roll 22. Referring to FIG. 3, there is illustrated a further embodiment according to the present invention, wherein the rigid metal member 35 is disposed between the bearing 31 and the adiabatic resin member 34 without play and, on its periphery surface, is provided with a flange 35' integrally fixed or formed to locate the bearing 31 which is fixed in the position by means of a ring shaped member 35'' to be welded or a retainer ring and with two fringes 35 extending inwardly from the opposite ends thereof for preventing the adiabatic member from disengaging.

What is claimed is:

1. In a fixing apparatus for a copying machine including a bearing device, a rotatable hollow fixing roll supported by said bearing device, and a heater contained within said hollow fixing roll, the improvement wherein said bearing device comprises a bearing, an annular resin adiabatic member, and an annular rigid metal member disposed between said bearing and said annular resin adiabatic member, said annular rigid metal member having a flange portion extending radially inwardly from an end of said annular rigid metal member.

2. A fixing apparatus as recited in claim 1, wherein said annular rigid metal member has two flange portions extending radially inwardly from the opposite ends of said annular rigid metal member.